US010025056B1

(12) United States Patent
Kranz et al.

(10) Patent No.: US 10,025,056 B1
(45) Date of Patent: Jul. 17, 2018

(54) CABLE SUPPORT DEVICES FOR FIBER OPTIC COMMUNICATIONS NETWORKS

(71) Applicant: AFL Telecommunications LLC, Duncan, SC (US)

(72) Inventors: Steven E. Kranz, Moore, SC (US); Matthew G. Welborn, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/657,855

(22) Filed: Jul. 24, 2017

Related U.S. Application Data

(60) Provisional application No. 62/526,102, filed on Jun. 28, 2017.

(51) Int. Cl.
*G02B 6/44* (2006.01)
*G02B 6/38* (2006.01)

(52) U.S. Cl.
CPC ......... *G02B 6/4471* (2013.01); *G02B 6/3885* (2013.01); *G02B 6/4432* (2013.01)

(58) Field of Classification Search
CPC ... G02B 6/4471; G02B 6/4432; G02B 6/3885
See application file for complete search history.

(56) References Cited

U.S. PATENT DOCUMENTS

| | | | | |
|---|---|---|---|---|
| 7,613,376 B2* | 11/2009 | Wright | ................ | G02B 6/4478 385/134 |
| 9,612,404 B2* | 4/2017 | Ray | ...................... | G02B 6/3616 |

* cited by examiner

*Primary Examiner* — Ryan Lepisto
(74) *Attorney, Agent, or Firm* — Dority & Manning, P.A.

(57) ABSTRACT

A cable support device defines a longitudinal axis, a lateral axis, and a transverse axis. The cable support device includes a first clamp plate which defines a plurality of slots, each of the plurality of slots extending into the first clamp plate from a front face of the first clamp plate and extending along the lateral axis. The cable support device further includes a second clamp plate which includes a front face. The cable support device further includes a mechanical fastener extending through the first clamp plate and the second clamp plate along the transverse axis to connect the first clamp plate and second clamp plate together.

21 Claims, 11 Drawing Sheets

CABLE SUPPORT DEVICES FOR FIBER OPTIC COMMUNICATIONS NETWORKS

CROSS-REFERENCE TO RELATED APPLICATIONS

This application is based upon and claims the benefit of priority from U.S. Provisional Patent Application No. 62/526,102, filed Jun. 28, 2017, the disclosure of which is incorporated by reference herein in its entirety.

FIELD

The present disclosure relates generally to fiber optic communications networks, and more particularly to cable support devices for use in fiber optic communications networks.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a premises (i.e. FTTP).

Drop cables are utilized to connect the end user to the distribution cable and thus the fiber optic network. For example, multi-port optical connection terminals have been developed for interconnecting drop cables with a fiber optic distribution cable at a predetermined branch point in a fiber optic network between a mid-span access location on the distribution cable and a delivery point such as a subscriber premises. Utilizing such terminals, drop cables extending from a delivery point may be physically connected to the communications network at the branch point provided by such terminals as opposed to at the actual mid-span access location provided on the distribution cable. Alternatively, however, drop cables may connect to the distribution cable at the mid-span access location.

Cables of the fiber optic network, such as stub cables and drop cables, may extend over relatively long distances, and typically are supported at various locations along these distances on poles such as power utility or telephone company owned poles. One current issue is that the power utility or telephone company that owns a pole requires payment (typically an annual lease payment) for each attachment to the pole to support such cable. Currently known apparatus for supporting such cables in such a manner only support individual cables, thus making the attachment of multiple cables to a pole a relatively expensive venture.

Further, apparatus for supporting such cables must support the cables while holding a certain tension, slip differential, and degree of line angle exit. Known apparatus do not offer a solution to this problem that is also of a desirably small size with a minimal number of assembly pieces and a simple installation process.

Accordingly, improved cable support devices for fiber optic communications networks would be advantageous. In particular, improved cable support devices which are capable of supporting multiple cables in a fiber optic communications networks would be desirable.

BRIEF DESCRIPTION

Aspects and advantages of the invention will be set forth in part in the following description, or may be obvious from the description, or may be learned through practice of the invention.

In accordance with one embodiment, a cable support device defining a longitudinal axis, a lateral axis, and a transverse axis is provided. The cable support device includes a first clamp plate which defines a plurality of slots, each of the plurality of slots extending into the first clamp plate from a front face of the first clamp plate and extending along the lateral axis. The cable support device further includes a second clamp plate which includes a front face. The cable support device further includes a mechanical fastener extending through the first clamp plate and the second clamp plate along the transverse axis to connect the first clamp plate and second clamp plate together.

In accordance with another embodiment, a cable support device defining a longitudinal axis, a lateral axis, and a transverse axis is provided. The cable support device includes a first clamp plate which defines a plurality of slots, each of the plurality of slots extending into the first clamp plate from a front face of the first clamp plate and extending along the lateral axis. The first clamp plate further includes a rear face opposite the front face and a plurality of protrusions extending from the rear face. The cable support device further includes a second clamp plate which includes a front face. The second clamp plate extends along the longitudinal axis between a first end face and a second end face. The second clamp plate further includes a first lip extending from the front face at the first end face and a second lip extending from the front face at the second end face. The cable support device further includes a mechanical fastener extending through the first clamp plate and the second clamp plate along the transverse axis to connect the first clamp plate and second clamp plate together.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
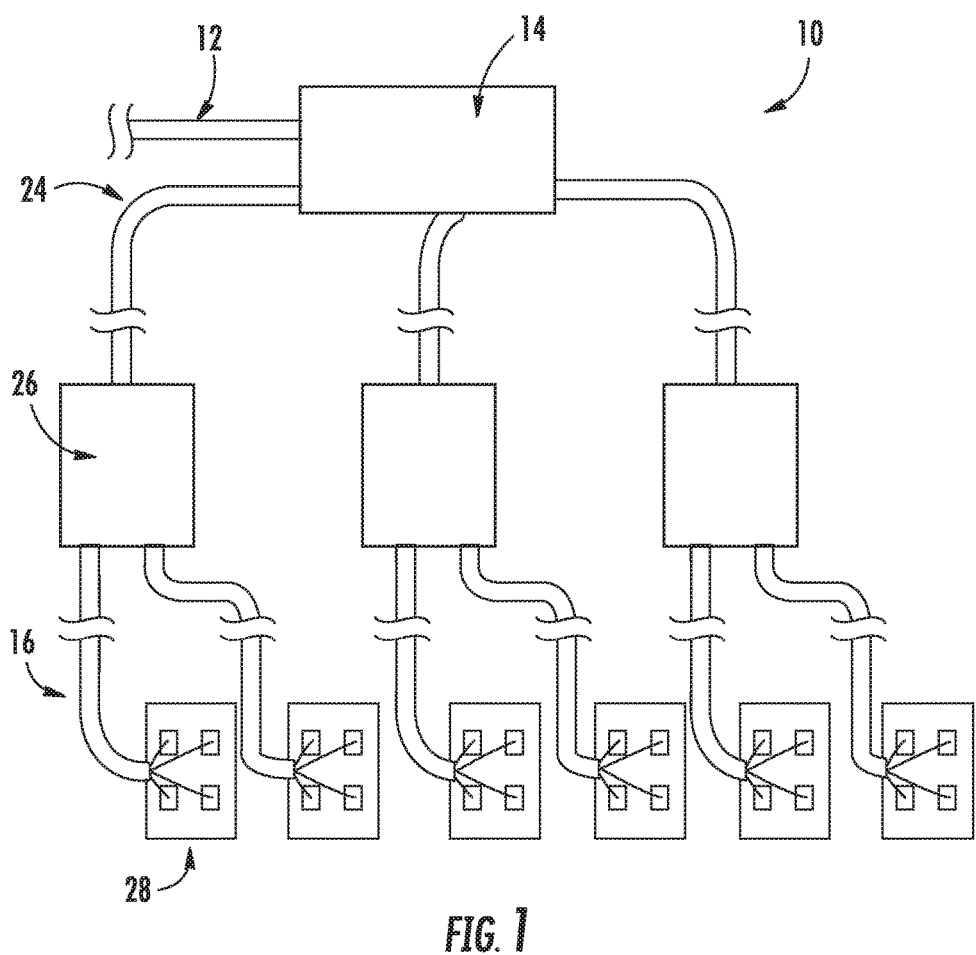
FIG. 1 is a schematic illustration of a known fiber optic communications network.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a portion of a known fiber optic communications network 10 which includes a fiber optic distribution cable 12 is shown. One or more mid-span access locations are provided along the length of the distribution cable 12. The mid-span access location may be enclosed and protected from exposure to the environment by a conventional closure 14. The fiber optic communications network 10 may include a fiber optic distribution cable 12 having a plurality of mid-span access locations at branch points spaced along the length of the distribution cable, each providing access to at least one, and preferably, a plurality of optical fibers of the fiber optic network. Thus, in the embodiments shown, the distribution cable 12 may provide multiple locations for joining stub cables 24 of multi-port optical connection terminals 26 to the distribution cable 12 at each mid-span access location.

In the fiber optic network 10 as illustrated, pre-terminated optical fibers of the distribution cable 12 provided at the mid-span access location are routed out of the distribution cable and spliced to respective optical fibers of a stub cable 24 extending from a multi-port optical connection terminal 26. The optical fibers of the stub cable 24 may enter the closure 14 through a suitable cable port provided through an exterior wall, for example an end wall, of the closure 14. The stub cable 24 includes at least one, and preferably a plurality of optical fibers disposed within a protective cable sheath. The stub cable 24 may, for example, be any known fiber optic cable which includes at least one optical fiber and having a fiber count equal to or greater than that of a drop cable 16 to be connected to the multi-port optical connection terminal 26 and equal to or less than that of the distribution cable 12.

The stub cable 24 may extend from the closure 14 into a terminal 26. The optical fibers of the stub cable 24 within the terminal 26 may be connectorized. One or more connectorized drop cables 16 may be interconnected with the connectorized optical fibers of the stub cable 24, i.e. in terminal 26. The drop cables 16 may include include at least one single mode or multimode optical fiber of any type optically connected to a single fiber or multi-fiber optical connector in a conventional manner. The other ends of the drop cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, one or more stub cables 24 extends from the closure 14 to a terminal 26 positioned at a distance from the mid-span access location, such as a telephone pole, hand-hole, vault or pedestal (not shown) in the fiber optic network 10. Each drop cable 16 extends from a terminal 26 to an outside plant connection terminal 28 located at a delivery point such as a subscriber premises.

It should be understood that the present disclosure is not limited to the above-described embodiment of a fiber optic network 10, and rather that any suitable fiber optic network 10 is within the scope and spirit of the present disclosure.

Figure 15:
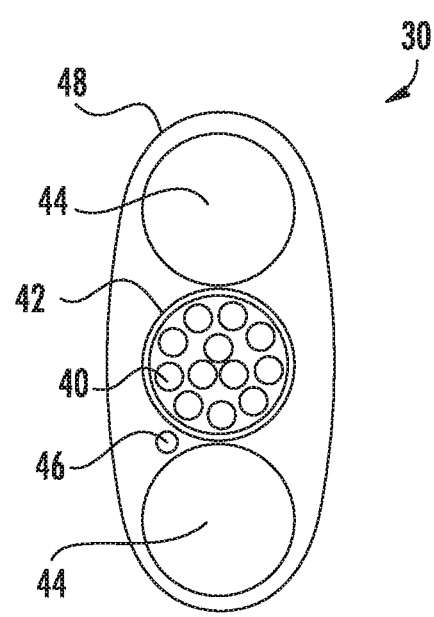
FIG. 15 is a cross-sectional view of a cable in accordance with embodiments of the present disclosure.

Referring now briefly to FIG. 15, a cable 30, such as a flat drop cable, in accordance with embodiments of the present disclosure is illustrated. Cable 30 may, in exemplary embodiments, be utilized as a stub cable 24 and/or drop cable 16. As shown, flat drop cable 30 may include a plurality of optical fibers 40 disposed within a buffer tube 42. In some embodiments, a gel may be provided in the buffer tube 42 surrounding the optical fibers 40. Flat drop cable 30 may further include strength members 44, which in exemplary embodiments may be water blocking dielectric strength members. A water blocking thread 46 may additionally be provided in the flat drop cable 30. A jacket 48 may surround the strength members 44, buffer tube 42 and water blocking thread 46. The jacket 48 may, for example, be formed from a UV resistant material. The jacket 48 may include and form an outermost layer and exterior surface of the flat drop cable 30. In exemplary embodiments as shown, the flat drop cable 30 generally, and thus the jacket 48 thereof, may have an oval-shaped cross-sectional profile. Accordingly, the cross-sectional profile may have a major radius and a minor radius which are not equal (with the major radius being greater than the minor radius), as opposed to a circular cross-sectional profile which has a constant radius.

Figure 11:
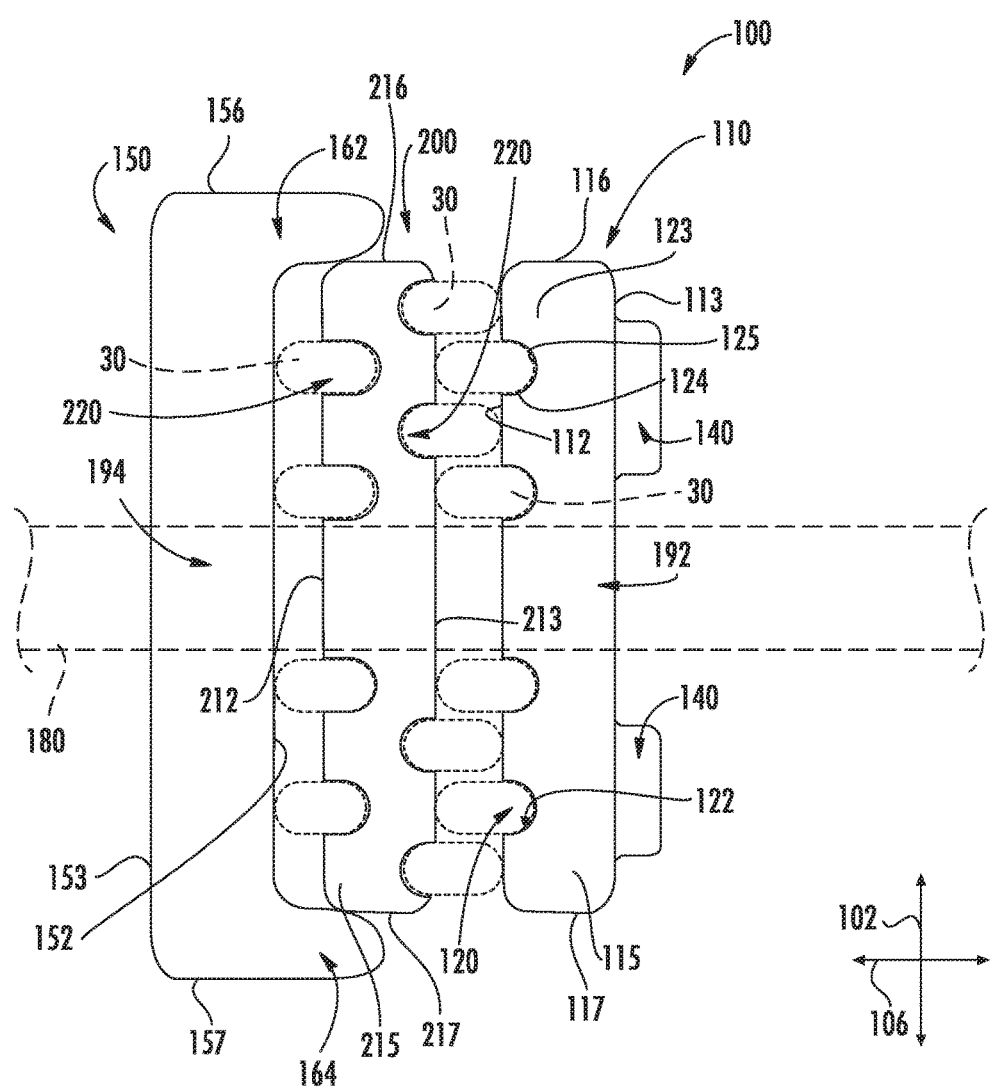
FIG. 11 is a side cross-sectional view of a cable support device in accordance with other embodiments of the present disclosure.
Figure 12:
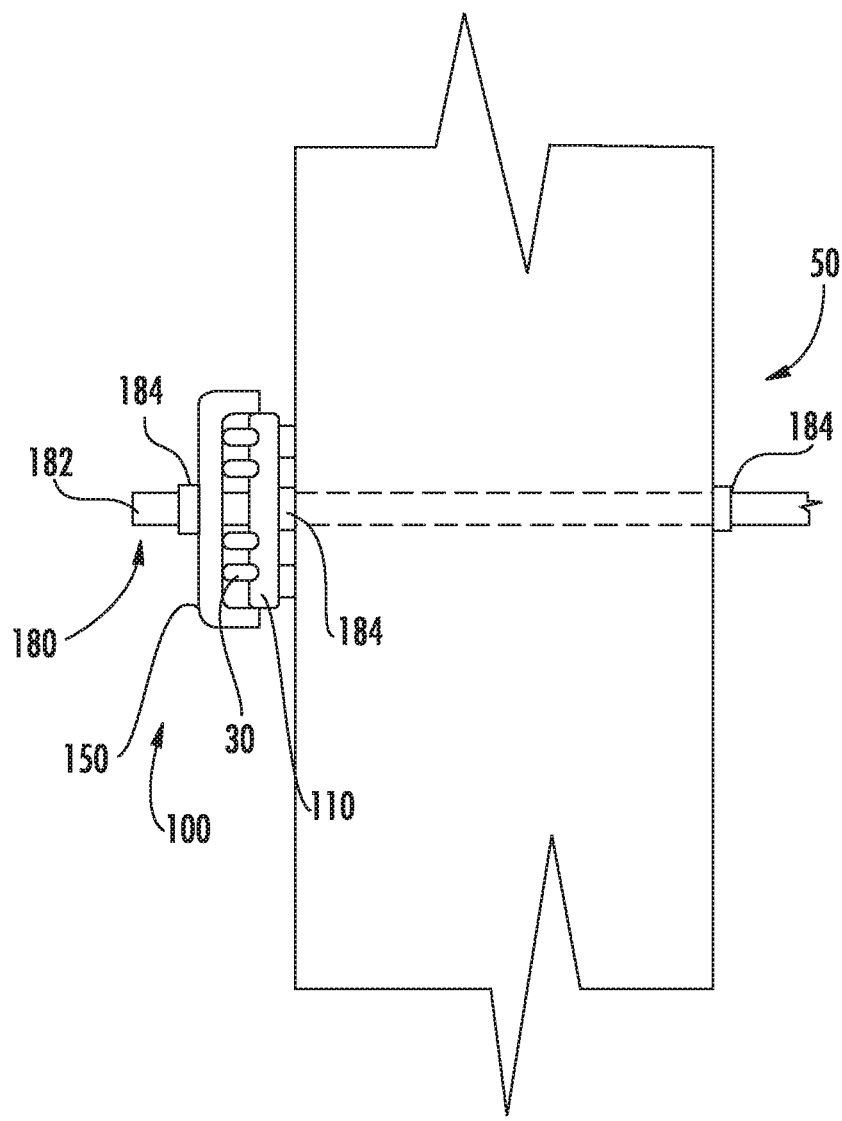
FIG. 12 is a side view of a cable support device supporting multiple drop cables in accordance with embodiments of the present disclosure.
Figure 13:
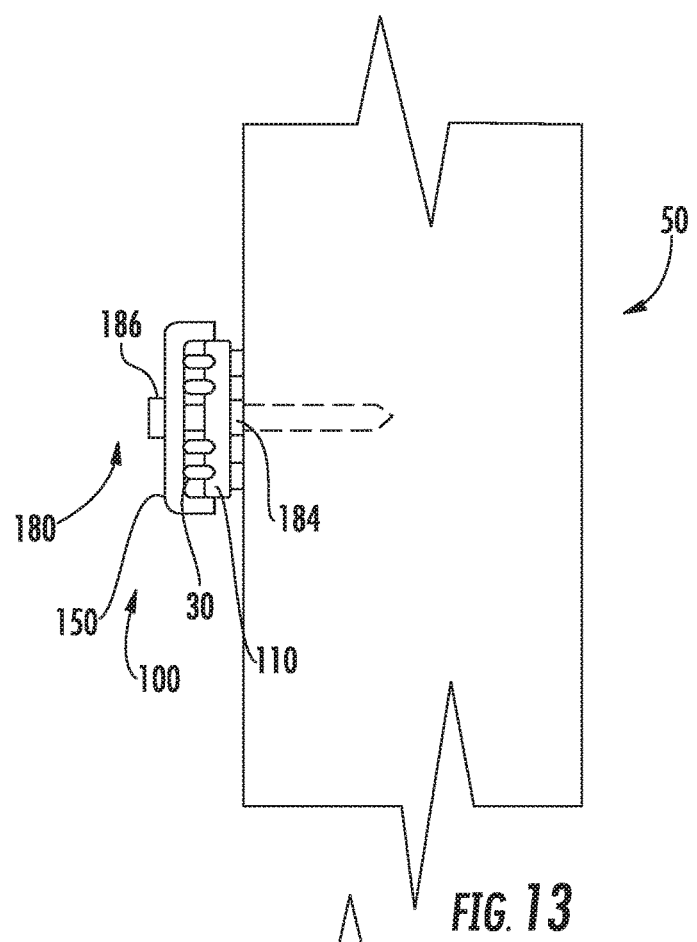
FIG. 13 is a side view of a cable support device supporting multiple drop cables in accordance with other embodiments of the present disclosure.
Figure 14:
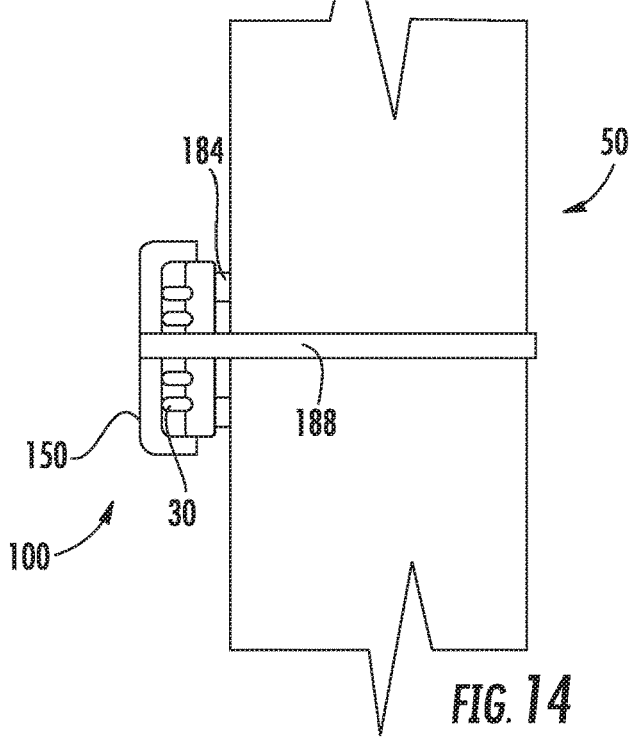
FIG. 14 is a side view of a cable support device supporting multiple drop cables in accordance with other embodiments of the present disclosure.

Referring now to FIGS. 2 through 14, embodiments of a cable support device 100 for supporting one or more cables 30, such as flat drop cables as discussed herein, are illustrated. Notably and as discussed, cable support devices 100 may be utilized with stub cables 24 and/or drop cables 16 and/or other suitable cables in network 10, and cables 30 as discussed herein may be utilized as any one or more of these cables. As shown in FIGS. 12 through 14, a cable support device 100 in accordance with the present disclosure may be mounted to and extend from an above-ground pole 50, which may be a power utility or telephone company owned pole. Advantageously, the cable support device 100 may provide support for multiple cables 30 while requiring only a single attachment to the pole 50, thus significantly reducing the expenses required with supporting the cables 30 on the pole 50. Further, the cable support device 100 may be of a desirably small size, and may have a minimal number of components which require a simple and efficient installation process.

Cable support devices 100 in accordance with the present disclosure may also provide other advantages. For example, such devices 100 may hold certain desirable tensions, slip differentials, and degree of line angle exits for the associated cables 30. In some embodiments, devices 100 in accordance with the present disclosure may for example, be capable of holding cables 30 at approximately 20 degrees of line angle and a slip differential of approximately 200 pounds.

As shown, a cable support device 100 defines a longitudinal axis 102, a lateral axis 104, and a transverse axis 106, all of which are mutually perpendicular defining an orthogonal coordinate system.

Cable support device 100 may include, for example, a first clamp plate 110. The first clamp plate 110 may serve as a main housing for the cables 30 in which cables 30 may be inserted during assembly. First clamp plate 110 may include a front face 112 and a rear face 113 opposite the front face 112. The front face 112 and rear face 113 may be spaced apart along the transverse axis 106. First clamp plate 110 may further include a first side face 114 and a second side face 115 which are spaced apart from each other along the lateral axis 104. First clamp plate 110 may further include a first end face 116 and a second end face 117 which are spaced apart from each other along the longitudinal axis 102.

A plurality of slots 120 may be defined in the first clamp plate 110. Each slot 120 may serve to house a cable 30 therein. Accordingly, during assembly, a user may place a portion of a cable 30 into a slot 120. In exemplary embodiments, four slot 120 may be defined in the first clamp plate 110, such that four cables 30 may be housed therein. Alternatively, however, two, three, five, six, or more slots 120 may be provided.

Each slot 120 may extend into the first clamp plate 110 from the front face 112, and may terminate within the first clamp plate 110 (i.e. not extend to the rear face 113). Each slot 120 may further extend along the lateral axis 104, such as coaxially with the lateral axis 104.

Figure 2:
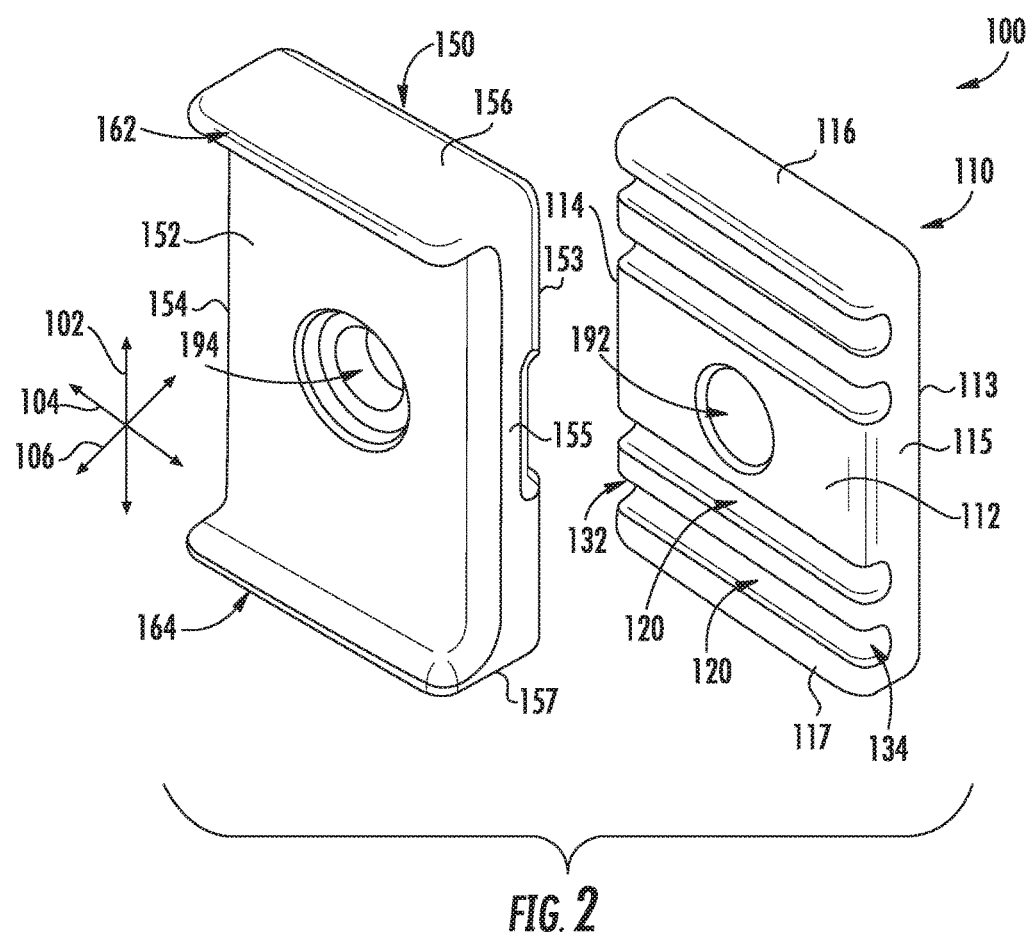
FIG. 2 is a perspective view of a first clamp plate and a second clamp plate of a cable support device in accordance with embodiments of the present disclosure.
Figure 4:
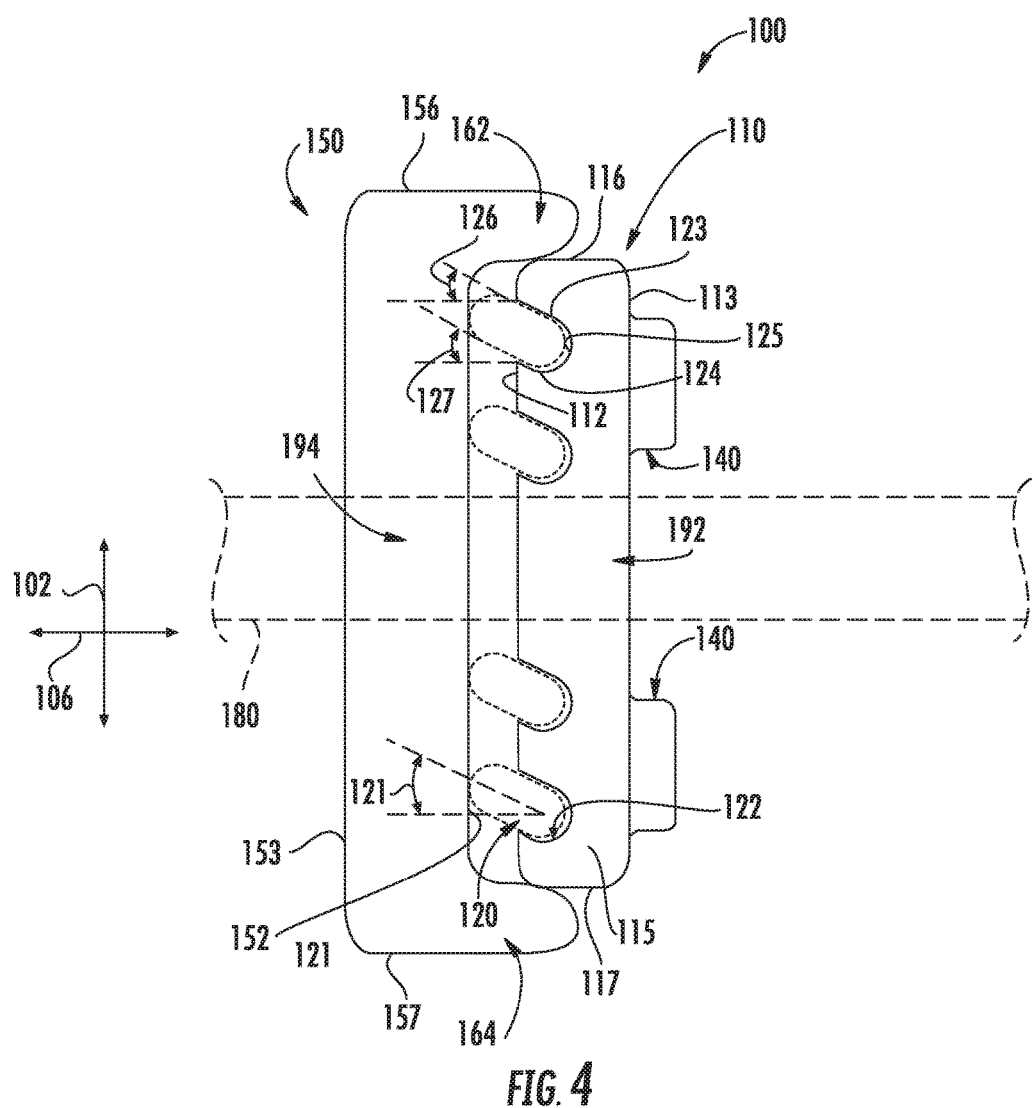
FIG. 4 is a side cross-sectional view of the cable support device of FIG. 2.
Figure 5:
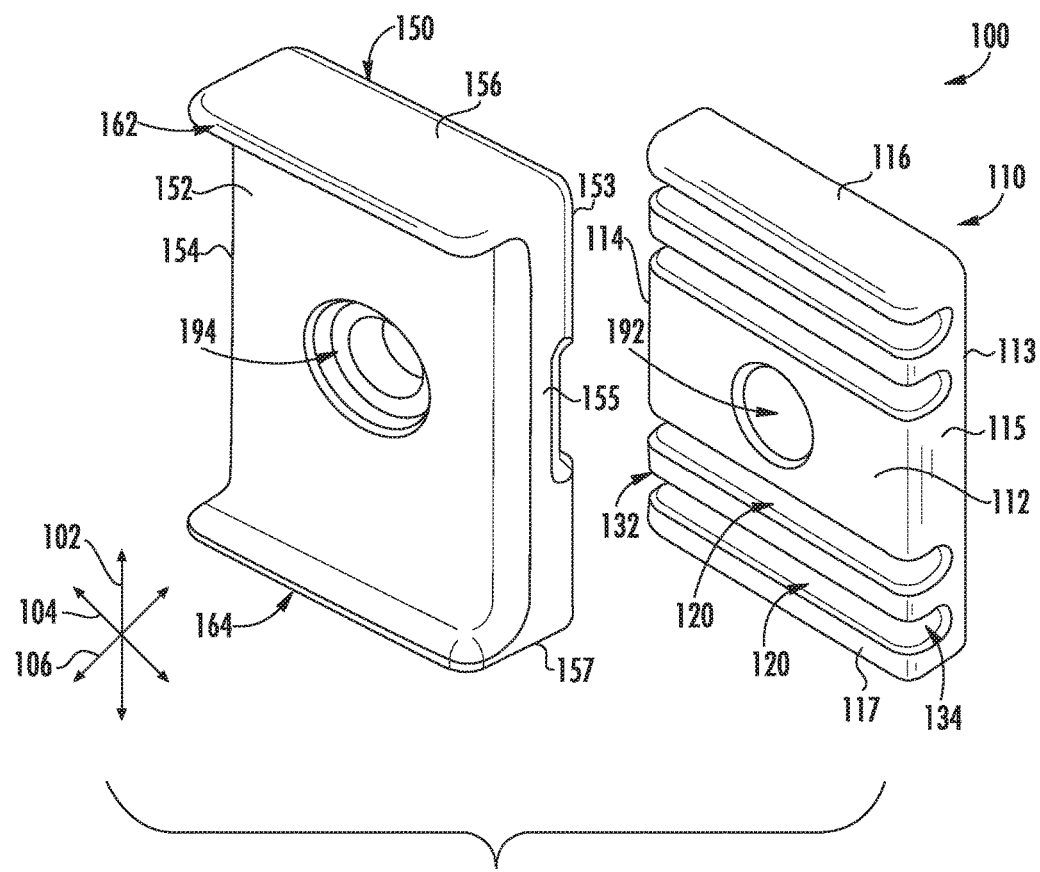
FIG. 5 is a perspective view of a first clamp plate and a second clamp plate of a cable support device in accordance with other embodiments of the present disclosure.

In some embodiments, as shown in FIGS. 5, 7, 8, and 10, one or more of the slots 120 (such as in exemplary embodiments each of the plurality of slots 120) extends into the first clamp plate 110 coaxially with the transverse axis 106. Alternatively, as shown in FIGS. 2 and 4, one or more of the slots 120 (such as in exemplary embodiments each of the plurality of slots 120) extends into the first clamp plate 110 at an angle 121 to the transverse axis 106. In exemplary embodiments, the angle is between 15 degrees and 45 degrees, such as between 20 degrees and 40 degrees, such as between 22 degrees and 35 degrees, such as between 24 degrees and 31 degrees. Such angle 121 may, in some embodiments, assist in retaining the cables 30 within the slots 120.

An inner surface 122 of the first clamp plate 110 may define each slot 120. Such inner surface 122 may include, for example, a first side portion 123 and second side portion 124 each extending from the front face 112. The first side portion 123 and second side portion 124 may be spaced apart along the longitudinal axis 102. In exemplary embodiments, the first side portion 123 and second side portion 124 may be linear. Further, in exemplary embodiments, an intermediate portion 125 may be disposed between and may connect the first side portion 123 and second side portion 124. The intermediate portion 125 may, in exemplary embodiments, be curvilinear.

In some exemplary embodiments, as illustrated in FIGS. 2 and 4, one or more of the slots 120 (such as in exemplary embodiments each of the plurality of slots 120) may taper from the front face 112. Such taper may advantageously facilitate easy and efficient entry of the cables 30 in the slots 120 while also facilitating secure housing of the cables 30 in the slots 120. For example, the first side portion 123 and second side portion 124 of an inner surface 122 may taper towards (and thus be angled towards) each other. An angle 126 to the transverse axis 106 of the first side portion 123 at the front face 112 may be different from an angle 127 to the transverse axis 106 of the second side portion 124 at the front face 112. For example, angle 126 may be between 22 degrees and 28 degrees, such as between 23 degrees and 27 degrees, such as between 24 degrees and 26 degrees, such as 25 degrees. Angle 127 may be between 27 degrees and 33 degrees, such as between 28 degrees and 32 degrees, such as between 29 degrees and 31 degrees, such as 30 degrees. Such different angles may define the taper.

In alternative embodiments, as illustrated in FIGS. 5, 7, 8, and 10, no taper may be provided from the front face 112 and, for example, the first side portion 123 and second side portion 124 may be parallel.

As discussed, each slot 120 may extend along the lateral axis 104. Further, each slot 120 may extend along the lateral axis 104 between and to the first side face 114 and second side face 115. Accordingly, a first end 132 of each slot 120 may be defined in the first side face 114, and a second end 134 of each slot 120 may be defined in the second side face 115. In exemplary embodiments as shown, the first end 132 and the second end 134 are radiused. Such radiused ends 132, 134 may advantageously reduce the risk of the cables 30 disposed in the slots 120 being damaged as the cables 30 exit the slots 120 via the first end 132 and second end 134.

Figure 3:
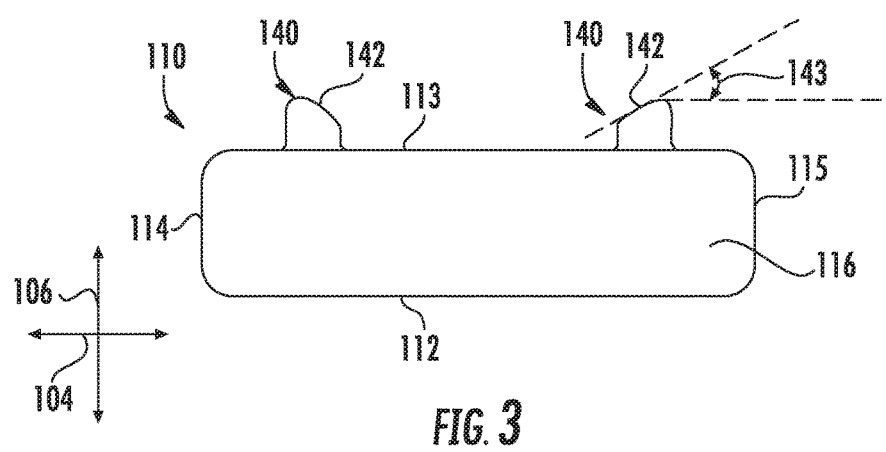
FIG. 3 is a top view of the first clamp plate of FIG. 2.
Figure 6:
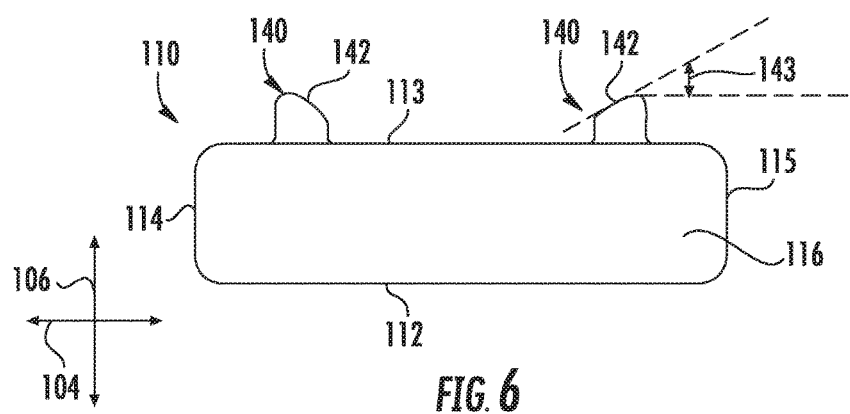
FIG. 6 is a top view of the first clamp plate of FIG. 5.
Figure 9:
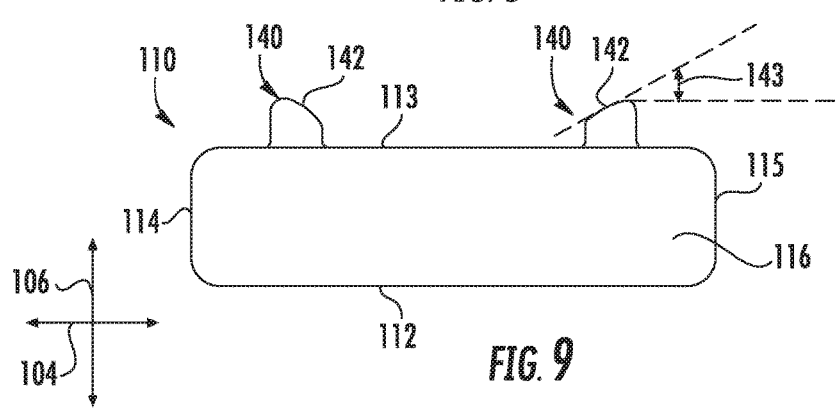
FIG. 9 is a top view of the first clamp plate of FIG. 8.

In exemplary embodiments as illustrated in FIGS. 3, 4, 6, 7, 9, and 10, the first clamp plate 110 may further include a plurality of protrusions 140. Each protrusion 140 may extend from the rear face 113, such as along the traverse axis 106. In further exemplary embodiments, as illustrated in FIGS. 3, 6, and 9, end faces 142 of each protrusion 140 may for example be beveled or chamfered and may thus for example extend at angles 143 to the lateral axis 104. In exemplary embodiments, angle 143 may be between 27 degrees and 33 degrees, such as between 28 degrees and 32 degrees, such as between 29 degrees and 31 degrees, such as 30 degrees. Protrusions 140 and the end faces 142 thereof may advantageously provide contact points for the first clamp plate 110 to contact a pole 50 when mounted thereto, and may further reduce the risk of movement of the cable support device 100 relative to the pole 50.

Cable support device 100 may further include, for example, a second clamp plate 150. The second clamp plate 150 may serve as a "keeper" which interfaces with the first clamp plate 110 to secure the cables 30 within the cable support device 100. The second clamp plate 150 may thus, when assembled in position relative to the first clamp plate 110, contact or be proximate the first clamp plate 110. Further, when assembled, cables 30 may be clamped between and in contact with the first clamp plate 110 and/or second clamp plate 150. Second clamp plate 150 may include a front face 152 and a rear face 153 opposite the front face 152. The front face 152 and rear face 153 may be spaced apart along the transverse direction. Second clamp plate 150 may further include a first side face 154 and a second side face 155 which are spaced apart from each other along the lateral axis 104. Second clamp plate 150 may further include a first end face 156 and a second end face 157 which are spaced apart from each other along the longitudinal axis 102.

In exemplary embodiments, as illustrated in FIGS. 2, 4, 5, 7, 8, and 10, second clamp plate 150 may further include a first lip 162 and a second lip 164. The first lip 162 may extend from the front face 152 at the first end face 156, such as along the transverse axis 106. The second lip 164 may extend from the front face 152 at the second end face 157, such as along the transverse axis 106. Accordingly, the first lip 162 and second lip 164 may be spaced apart from each other along the longitudinal axis 102. As shown, the lips 162, 164 may serve to seat and border the first clamp plate 110 within the second clamp plate 150 when the plates 110, 150 are assembled together. For example, when assembled, the first lip 162 may contact and/or neighbor the first end face 116 and the second lip 164 may contact and/or neighbor the second end face 117.

In alternative embodiments, second clamp plate 150 need not include lips such as first lip 162 and second lip 164.

Figure 8:
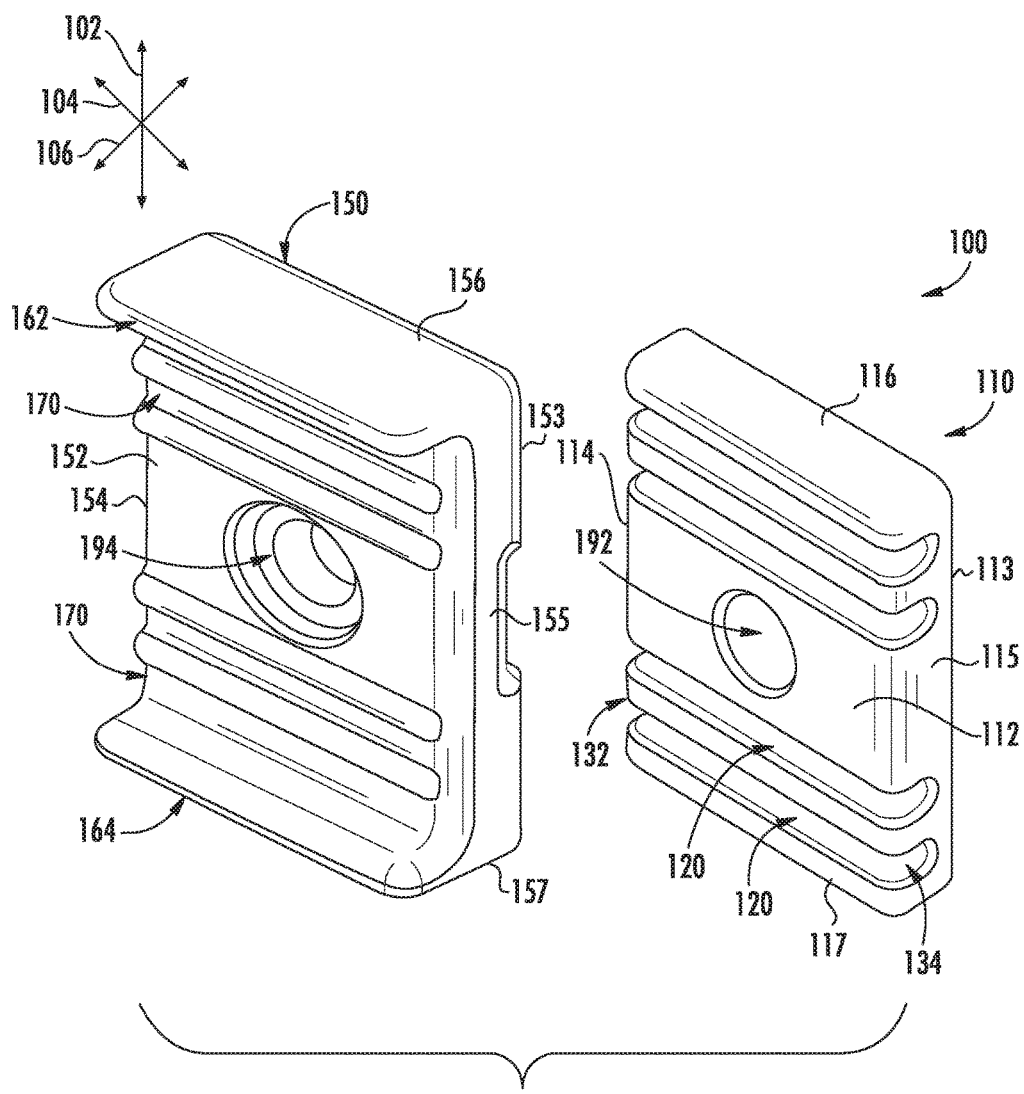
FIG. 8 is a perspective view of a first clamp plate and a second clamp plate of a cable support device in accordance with other embodiments of the present disclosure.
Figure 10:
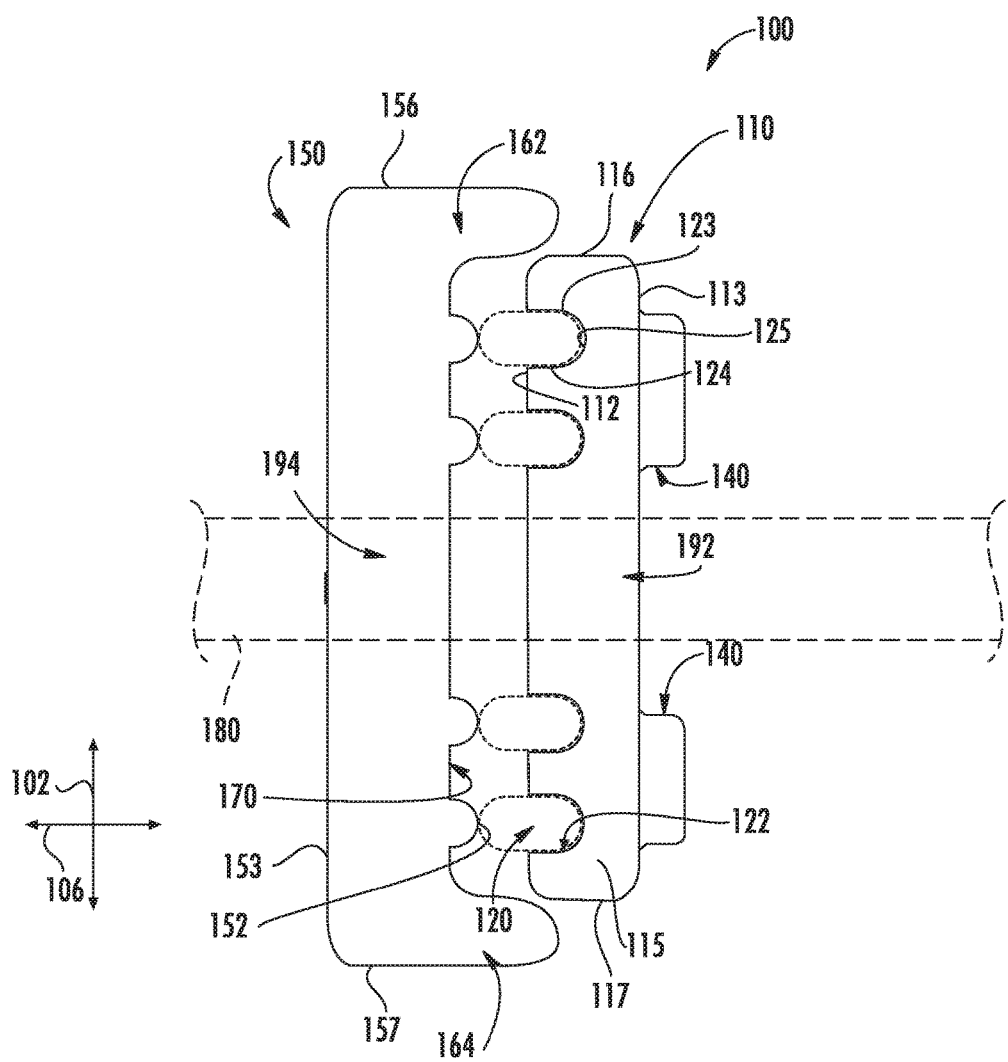
FIG. 10 is a side cross-sectional view of the cable support device of FIG. 8.

In some embodiments, as illustrated in FIGS. 8 and 10, a plurality of channels 170 may be defined in the second clamp plate 150. Each channel 170 may serve to house a cable 30 therein, supporting an associated slot 120 of the first clamp plate 150. Accordingly, during assembly, a user may place a portion of a cable 30 extending from the first clamp plate 110 into a channel 170. In such embodiments, the longitudinal positioning of each channel 170 may be different from, such as offset from, the longitudinal positioning of an associated slot 120, thus in some embodiments allowing cables 30 to contact the front face 152 at protruding front face 152 locations that neighbor the channels 170. Further, the same number of channels 170 as slots 120 or less channels 170 than slots 120 may be provided.

Each channel 170 may extend into the second clamp plate 150 from the front face 152, and may terminate within the second clamp plate 150 (i.e. not extend to the rear face 153). Each channel 170 may further extend along the lateral axis 104, such as coaxially with the lateral axis 104. In exemplary embodiments, channels 170 are shallower than slots 120 (i.e. channels 170 extend a lesser distance into the second clamp plate 150 than slots 120 extend into first clamp plate 110 along the transverse axis 106).

In alternative embodiments, as illustrated in FIGS. 2, 4, 5, and 7, second clamp plate 150 need not include channels 170. In these embodiments, front face 152 may be generally solidly planer (with the exception of bores therethrough for mechanical fasteners as discussed herein).

In exemplary embodiments, the first clamp plate 110 and the second clamp plate 150 are each formed from a polymer, such as a plastic or a rubber. In particular, suitable materials may include thermoplastic resins, foamable plastics, or ethylene propylene diene monomer rubbers. In exemplary embodiments, the same material(s) may be utilized to form the first clamp plate 110 and second clamp plate 150.

Figure 7:
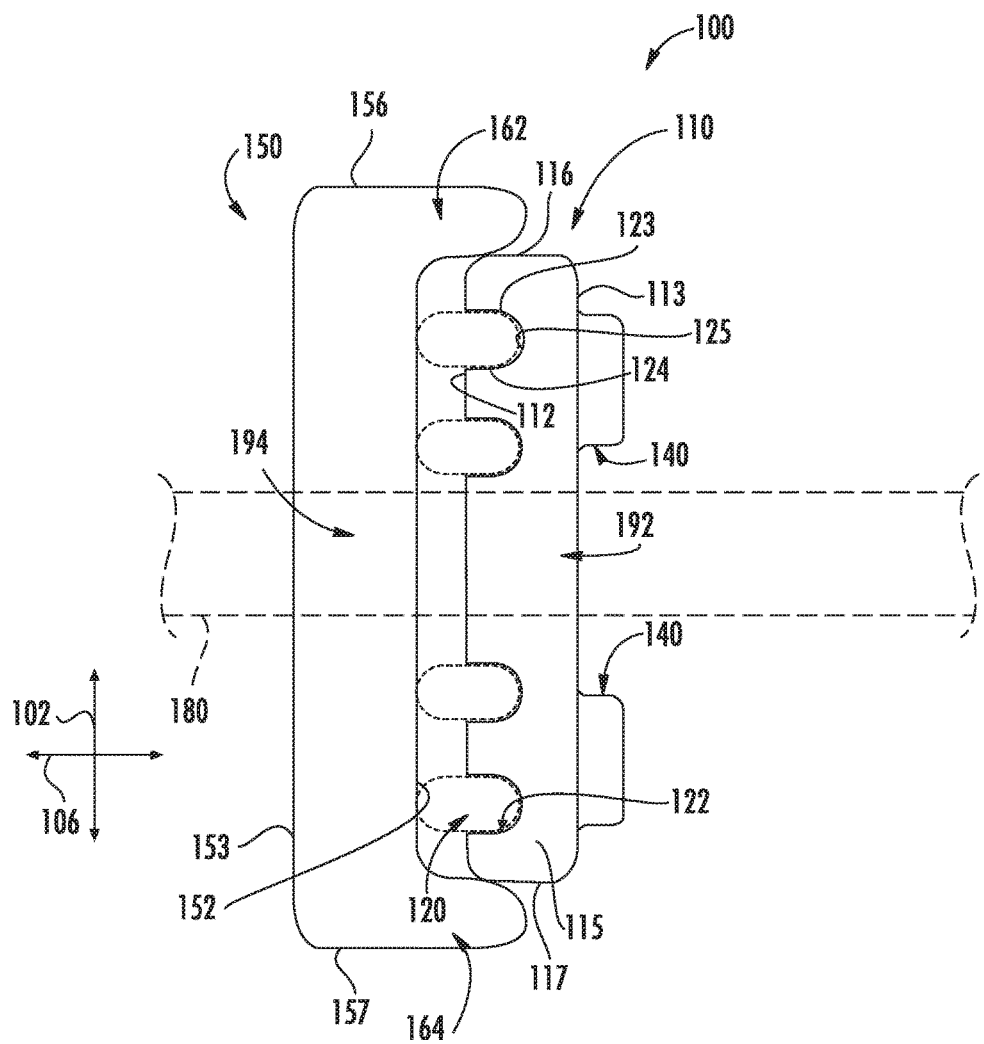
FIG. 7 is a side cross-sectional view of the cable support device of FIG. 5.

In the embodiments illustrated in, For example, FIGS. 4, 7, and 10, the cables 30 are disposed directly between the first clamp plate 110 and the second clamp plate 150. In alternative embodiments, as illustrated in FIG. 11, one or more intermediary clamp plates 200 may be provided between (along the transverse axis 106) the first clamp plate 110 and the second clamp plate 150. Such intermediary clamp plates 200 may serve to expand the capability of the cable support device 100 to house a certain number of cables 30, such that additional cables 30 may be housed within the cable support device 100.

As shown, the intermediary clamp plate 200 may include a front face 212 and a rear face 213 opposite the front face 212. The front face 212 and rear face 213 may be spaced apart along the transverse direction 106. Intermediary clamp plate 200 may further include a first side face (not shown) and a second side face 215 which are spaced apart from each other along the lateral axis 104. Intermediary clamp plate 200 may further include a first end face 216 and a second end face 217 which are spaced apart from each other along the longitudinal axis 102.

A plurality of slots 220 may be defined in the intermediary clamp plate 200. Each slot 220 may serve to house a cable 30 therein. Accordingly, during assembly, a user may place a portion of a cable 30 into a slot 220.

One or more slots 220 may extend into the intermediary clamp plate 200 from the front face 212, and may terminate within the intermediary clamp plate 200 (i.e. not extend to the rear face 213). Additionally or alternatively, one or more slots 220 may extend into the intermediary clamp plate 200 from the rear face 213, and may terminate within the intermediary clamp plate 200 (i.e. not extend to the front face 212). Each slot 220 may further extend along the lateral axis 104, such as coaxially with the lateral axis 104.

In some embodiments, as shown, one or more of the slots 220 (such as in exemplary embodiments each of the plurality of slots 120) extends into the intermediary clamp plate 200 coaxially with the transverse axis 106. Alternatively, one or more of the slots 220 (such as in exemplary embodiments each of the plurality of slots 120) extends into the intermediary clamp plate 200 at an angle to the transverse axis 106, such as is discussed above with respect to slots 120.

In some embodiments, one or more of the slots 220 (such as in exemplary embodiments each of the plurality of slots 220) may taper from the front face 212 or rear face 213, such as is discussed above with respect to slots 120. In alternative embodiments, as shown, no such taper may be provided.

Each slot 220 may extend along the lateral axis 104. Further, each slot 220 may extend along the lateral axis 104 between and to the first side face and second side face 215. Accordingly, a first end of each slot 220 may be defined in the first side face, and a second end of each slot 220 may be defined in the second side face 215. In exemplary embodiments, the first end and the second end are radiused. Such radiused ends may advantageously reduce the risk of the cables 30 disposed in the slots 220 being damaged as the cables 30 exit the slots 220 via the first end and second end.

As illustrated in FIGS. 4, 7, 10, 11, 12, and 13, a mechanical fastener 180 may extend through the first clamp plate 110 and second clamp plate 150 (such as through bore holes 192, 194 defined therein) along the transverse axis 106. The mechanical fastener 180 may thus connect the first clamp plate 110 and second clamp plate 150 together. In some embodiments, as illustrated in FIG. 12, the mechanical fastener 180 may include a bolt 182 and a plurality of nuts 184. The bolt 182 may extend through the first and second clamp plates 150 as well as, in some embodiments as illustrated in FIG. 12, the pole 150 to connect the plates 150 together and to the pole 150. Nuts 184 may secure such connections and ensure that the cables 30 are suitably clamped between the first and second clamp plates 150. In other embodiments, as illustrated in FIG. 13, the mechanical fasteners 180 may include a lag screw 186. The lag screw 186 may extend through the first and second clamp plates 110, 150 as well as the pole 50 to connect the plates 110, 150 together and to the pole 150, and may further secure such connections and ensure that the cables 30 are suitably clamped between the first and second clamp plates 150.

Additionally or alternatively, other suitable mechanical fasteners may be utilized. For example, as illustrated in FIG. 14, a band 188 or other suitable device connects the cable support device 100 to the pole 50, and may further connect the first clamp plate 110 and the second clamp plate 150 together. For example, band 188 may extend around an exterior of the pole 50 and the device 100 (i.e. by contacting second clamp plate 150) to provide such connections.

It should be noted that such various embodiments of mechanical fasteners 180 may include various additional components, such as washers, bushings, etc., to facilitate such connections as discussed herein. It should also be noted that the band 188 may include a buckle, nut/bolt combination, or other suitable apparatus for connecting and tightening the belt to facilitate the various required connections.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable support device defining a longitudinal axis, a lateral axis, and a transverse axis, the cable support device comprising:
    a first clamp plate which defines a plurality of slots, each of the plurality of slots extending into the first clamp plate from a front face of the first clamp plate and extending along the lateral axis;
    a second clamp plate comprising a front face, a first lip extending from the front face at a first end of the front face and a second lip extending from the front face at a second end of the front face; and
    a mechanical fastener extending through the first clamp plate and the second clamp plate along the transverse axis to connect the first clamp plate and second clamp plate together;
    wherein the front face of the second clamp plate faces the front face of the first clamp plate when the first clamp plate and second clamp plate are connected together.

2. The cable support device of claim 1, wherein each of the plurality of slots extends into the first clamp plate coaxially with the transverse axis.

3. The cable support device of claim 1, wherein each of the plurality of slots extends into the first clamp plate at an angle to the transverse axis.

4. The cable support device of claim 1, wherein each of the plurality of slots tapers from the front face into the first clamp plate.

5. The cable support device of claim 1, wherein an inner surface defining each of the plurality of slots comprises a first side portion, a second side portion, and an intermediate portion disposed between and connecting the first side portion and the second side portion, the intermediate portion being curvilinear.

6. The cable support device of claim 5, wherein the first side portion at the front face of the first clamp plate is disposed at an angle to the transverse axis that is different from an angle to the transverse axis of the second side portion at the front face of the first clamp plate.

7. The cable support device of claim 1, wherein each of the plurality of slots extends along the lateral axis between a first side face and a second side face of the first clamp plate such that a first end of each of the plurality of slots is defined in the first side face and a second end of each of the plurality of slots is defined in the second end face.

8. The cable support device of claim 7, wherein the first end and the second end are radiused.

9. The cable support device of claim 1, wherein the first clamp plate further comprises a rear face opposite the front face and a plurality of protrusions extending from the rear face.

10. The cable support device of claim 9, wherein an end face of each of the plurality of protrusions extends at an angle to the lateral axis.

11. The cable support device of claim 1, wherein the second clamp plate extends along the longitudinal axis between a first end face and a second end face, and wherein the second clamp plate further comprises a first lip extending from the front face at the first end face and a second lip extending from the front face at the second end face.

12. The cable support device of claim 1, wherein the second clamp plate defines a plurality of channels, each of the plurality of channels extending into the second clamp plate from a front face of the second clamp plate and extending along the lateral axis.

13. The cable support device of claim 1, wherein the first clamp plate and the second clamp plate are each formed from a polymer.

14. A cable support device defining a longitudinal axis, a lateral axis, and a transverse axis, the cable support device comprising:
    a first clamp plate which defines a plurality of slots, each of the plurality of slots extending into the first clamp plate from a front face of the first clamp plate and extending along the lateral axis, and wherein the first clamp plate further comprises a rear face opposite the front face and a plurality of protrusions extending from the rear face;
    a second clamp plate comprising a front face, wherein the second clamp plate extends along the longitudinal axis between a first end face and a second end face, and wherein the second clamp plate further comprises a first lip extending from the front face at the first end face and a second lip extending from the front face at the second end face; and
    a mechanical fastener extending through the first clamp plate and the second clamp plate along the transverse axis to connect the first clamp plate and second clamp plate together;
    wherein the front face of the second clamp plate faces the front face of the first clamp plate when the first clamp plate and second clamp plate are connected together.

15. The cable support device of claim 14, wherein each of the plurality of slots extends into the first clamp plate coaxially with the transverse axis.

16. The cable support device of claim 14, wherein each of the plurality of slots extends into the first clamp plate at an angle to the transverse axis.

17. The cable support device of claim 4, wherein each of the plurality of slots tapers from the front face into the first clamp plate.

18. The cable support device of claim 14, wherein each of the plurality of slots extends along the lateral axis between a first side face and a second side face of the first clamp plate such that a first end of each of the plurality of slots is defined in the first side face and a second end of each of the plurality of slots is defined in the second end face.

19. The cable support device of claim 18, wherein the first end and the second end are radiused.

20. The cable support device of claim 14, wherein an end face of each of the plurality of protrusions extends at an angle to the lateral axis.

21. The cable support device of claim 14, wherein the second clamp plate defines a plurality of channels, each of the plurality of channels extending into the second clamp plate from a front face of the second clamp plate and extending along the lateral axis.

\* \* \* \* \*